United States Patent
Serieys

(10) Patent No.: US 12,187,414 B2
(45) Date of Patent: Jan. 7, 2025

(54) REDUNDANT PIVOT BEARING WITH MECHANICAL DETECTION

(71) Applicant: Ratier-Figeac SAS, Figeac (FR)

(72) Inventor: Julien Serieys, Lunan (FR)

(73) Assignee: RATIER-FIGEAC SAS, Figeac (FR)

( * ) Notice: Subject to any disclaimer, the term of this patent is extended or adjusted under 35 U.S.C. 154(b) by 180 days.

(21) Appl. No.: 17/945,439

(22) Filed: Sep. 15, 2022

(65) Prior Publication Data

US 2023/0086728 A1    Mar. 23, 2023

(30) Foreign Application Priority Data

Sep. 17, 2021   (EP) .................................... 21290058

(51) Int. Cl.
| | |
|---|---|
| *B64C 13/00* | (2006.01) |
| *B64C 13/04* | (2006.01) |
| *F16C 11/08* | (2006.01) |
| *F16C 19/52* | (2006.01) |

(52) U.S. Cl.
CPC .......... *B64C 13/0421* (2018.01); *F16C 11/08* (2013.01); *F16C 19/52* (2013.01)

(58) Field of Classification Search
CPC ...... B64C 13/0421; F16C 11/08; F16C 19/52; F16C 2326/43; F16C 11/04; F16C 39/02; B64D 31/04
See application file for complete search history.

(56) References Cited

U.S. PATENT DOCUMENTS

| | | | |
|---|---|---|---|
| 2009/0116777 A1 | 5/2009 | Blades et al. | |
| 2021/0009388 A1* | 1/2021 | Lutzeyer | B66F 17/006 |
| 2024/0019889 A1* | 1/2024 | Lawniczak | F16C 35/042 |

FOREIGN PATENT DOCUMENTS

| | | |
|---|---|---|
| EP | 2604874 A1 | 6/2013 |
| EP | 3445647 A1 | 2/2019 |
| WO | 2017182836 A1 | 10/2017 |

OTHER PUBLICATIONS

European Search Report for Application No. 21290058.3, mailed Mar. 18, 2022, 5 pages.

* cited by examiner

*Primary Examiner* — Victor L MacArthur
(74) *Attorney, Agent, or Firm* — CANTOR COLBURN LLP

(57) ABSTRACT

A pivot assembly for a control lever. The pivot assembly include a primary pivot bearing arranged about a longitudinal axis (A) and a redundant pivot bearing arranged about the longitudinal axis (A). The redundant pivot bearing is configured to become operative as a bearing in the event that the primary pivot bearing malfunctions, and to produce haptic feedback in the control lever throughout operation of the redundant pivot bearing.

15 Claims, 7 Drawing Sheets

REDUNDANT PIVOT BEARING WITH MECHANICAL DETECTION

CROSS REFERENCE TO RELATED APPLICATIONS

This application claims priority to European Patent Application No. 21290058.3 filed Sep. 17, 2021, the entire contents of which is incorporated herein by reference.

TECHNICAL FIELD

This disclosure relates to a pivot assembly of a control lever for a vehicle, in particular (although not exclusively) for an aircraft.

BACKGROUND

In a vehicle, a control stick or lever, or another type of mechanical input control device, may be provided to control the range of movement of the vehicle. The control stick may control a number of control parameters. For example, a control stick in an aircraft can be arranged to control the pitch and roll of the aircraft by allowing rotation of the control stick about a number of axes. A thrust lever in an aircraft can be used to control the thrust provided by the aircraft engines. A pedal assembly can be used to control the yaw and the wheel brakes of an aircraft, for example.

In order to facilitate rotation of the control stick about one of its axes, the shaft of the control stick may be mounted to a pivot bearing. Typical pivot bearings include rolling-element bearings, e.g., comprising balls or rollers. Rolling-element bearings, while providing a low-friction pivot, are susceptible to shock loads, breakage of the rolling-element, breakage of the bearing races, or wear due to dust or dirt entering the bearing. This can lead to a jamming of the bearing which may prevent movement of the control stick (or lever or pedal). In the example of an aircraft, jamming of the bearing of a control stick or lever may prevent control over the rotation of the aircraft about the axes or control of the thrust of the engines. This can lead to serious safety issues such as the aircraft crashing.

To obviate these disadvantages, conventional control stick pivots often incorporate a second bearing assembled concentrically with the primary rolling-element bearing to provide redundancy; the second, redundant bearing becomes operable as a sliding bearing in the event that the primary rolling-element bearing fails. Thus, in the case of a control stick for an aircraft, the pilot is able to continue using the control stick should the rolling-element bearing fail.

FIG. 1 of the accompanying drawings shows a prior art pivot assembly 100 as disclosed in WO 2017/182836 A1 (the content of which is incorporated herein by reference in its entirety). The pivot assembly 100 comprises a shaft 110 having a longitudinal axis R-R about which said shaft 110 can rotate, and control stick pivot 200 provided about an end of said shaft 110 within a housing 120.

The control stick pivot 200 comprises a primary pivot bearing 210 and a redundant pivot bearing 220, both concentric about shaft 110 and configured to rotate about axis R-R. Primary pivot bearing 210 is a rolling-element bearing comprising an outer bearing race 212 with an outer surface 213 fixed to the housing 120 and an inner bearing race 214 provided about the redundant pivot bearing 220. Redundant pivot bearing 220 comprises a bushing 225 provided between the primary pivot bearing 210 and the shaft 110.

As shaft 110 rotates about axis R-R, redundant pivot bearing 220 and inner bearing race 214 rotate with the shaft 110. Should the primary pivot bearing 210 malfunction, such that primary pivot bearing 210 seizes or fails to operate efficiently, sliding contact between the redundant pivot bearing 220 and inner element 214 or between the redundant pivot bearing 220 and the shaft 110 commences. Thus, the redundant pivot bearing 220 becomes operative as a pivot.

The torque required to turn shaft 110 is inherently greater when the control stick pivot 200 is operating with sliding contact rather than rolling contact. Thus the user may detect a failure of the primary pivot bearing 210 as the control stick will feel stiffer to manoeuvre. The choice of material for the redundant pivot bearing 220 may be selected to require a desired level of friction torque in the shaft 110 before it becomes operative which is not significantly different to impart control issues but which might still be observable to an alert pilot. WO 2017/182836 A1 also discloses that visual indicators, such as a frangible link or an alignment guide, or sensors, such as optical, electrical or magnetic sensors, may also be used to alert the user or a maintenance engineer that the primary pivot bearing 210 has malfunctioned.

However, there are improvements that can be made in the detection of failure of the primary pivot bearing.

SUMMARY

An aspect of the present disclosure provides a pivot assembly for a control lever, the pivot assembly comprising a primary pivot bearing arranged about a longitudinal axis, and a redundant pivot bearing arranged about the longitudinal axis, the redundant pivot bearing configured to become operative as a bearing in the event that the primary pivot bearing malfunctions, and to produce haptic feedback (e.g., in the control lever) throughout operation of the redundant pivot bearing. The haptic feedback may be produced by a variation in the torque required to pivot the redundant pivot bearing or control lever when the redundant pivot bearing is operative as a bearing. Using haptic feedback throughout operation of the redundant pivot bearing provides improvements, in that the operator knows for sure that there has been a change in operation whenever they move the lever. Small, frequent variations could be used to provide the haptic feedback as a vibration effect that could be felt by a user. Alternatively, a smaller number (e.g., one or two) large variations could be used. This concept can be modified within the scope of this aspect to provide various types of haptic feedback that could be felt by a user throughout operation of the redundant pivot bearing.

For example, the redundant pivot bearing may comprise a detent mechanism to produce the haptic feedback, for example by varying the torque required to pivot the redundant pivot bearing.

The redundant pivot bearing may comprise a detent ring and a carrier ring arranged about the longitudinal axis. The detent ring and carrier ring may be configured such that, when the redundant pivot bearing is operative as a bearing, one of the detent ring and carrier ring rotates about the longitudinal axis relative to the other, and the detent ring and carrier ring cooperate to provide the detent mechanism to produce the haptic feedback.

The detent ring may comprise a detent profile and the carrier ring may comprise one or more protruding elements and one or more springs. The detent ring and carrier ring may be arranged such that the one or more protruding elements are directly opposite and in contact with the detent profile, the one or more springs are preloaded to bias the at least one protruding element against the detent profile, and the detent profile and one or more protruding elements are shaped to produce the haptic feedback under the bias of the spring when there is relative rotational motion between the detent ring and carrier ring about the longitudinal axis.

The carrier ring may comprise one or more bores in the second surface, each spring arranged within each bore. Each protruding element may comprise a ball bearing received within an opening of each bore at the second surface, wherein the spring is preloaded to bias the ball bearing against the detent profile.

The detent profile may be on a radially inner surface of the detent ring directly opposite a radially outer surface of the carrier ring. The carrier ring may comprise a radially inner surface, a circumferential recess in the radially inner surface, and one or more bores extending between the circumferential recess and the radially outer surface. The one or more protruding elements may be received within each bore and protrude into the circumferential recess and out from the radially outer surface. The one or more springs may comprise a spring ring arranged within the circumferential recess in contact with the one or more protruding elements, the spring ring preloaded to bias the one or more protruding elements against the detent profile. Each protruding element may comprise a ball bearing.

The detent profile may comprise at least one groove configured to receive the one or more protruding elements such that the haptic feedback is produced as the at least one protruding element enters and/or exits the at least one groove when there is relative rotational motion between the detent ring and carrier ring about the longitudinal axis.

The primary pivot bearing may be fixed to or integral with the detent ring such that, in the event that the primary pivot bearing malfunctions, the primary pivot bearing transfers torque to the detent ring so that the primary pivot bearing and detent ring rotate together about the longitudinal axis relative to the carrier ring.

The primary pivot bearing may be fixed to or integral with the carrier ring such that, in the event that the primary pivot bearing malfunctions, the primary pivot bearing transfers torque to the carrier ring so that the primary pivot bearing and carrier ring rotate together about the longitudinal axis relative to the detent ring.

The redundant pivot bearing may comprise at least one spring that is preloaded to produce an axial force on the primary pivot bearing.

The pivot assembly may comprise a sensor, such as a strain gauge, to detect the haptic feedback from the redundant pivot bearing.

The primary pivot bearing may be a rolling-element bearing. The redundant pivot bearing may be a friction bearing or a rolling-element bearing.

The pivot assembly may further comprise a shaft and a housing, wherein the pivot assembly is mounted about the shaft within the housing. The detent ring may be replaced by a detent profile on the shaft.

Another aspect of the present disclosure provides a control lever assembly comprising a control lever and the pivot assembly of any of the above embodiments, arranged such that the redundant pivot bearing produces haptic feedback in the control lever throughout operation of the redundant pivot bearing.

Another aspect of the present disclosure provides a method for detecting malfunction of a control lever assembly, the method comprising pivoting a control lever on a shaft using a pivot assembly, the pivot assembly comprising a primary pivot bearing arranged about a longitudinal axis of the shaft and a redundant pivot bearing arranged about the longitudinal axis, the redundant pivot bearing becoming operative as a bearing in the event that the primary pivot bearing malfunctions, and throughout operation of the redundant pivot bearing, the redundant pivot bearing producing haptic feedback in the control lever. As discussed above in respect of the first aspect, the haptic feedback may be produced by a variation in the torque required to pivot the redundant pivot bearing or control lever when the redundant pivot bearing is operative as a bearing.

For example, the redundant pivot bearing may comprise a detent mechanism to produce the haptic feedback, for example by varying the torque required to pivot the redundant pivot bearing.

The redundant pivot bearing may comprise a detent ring and a carrier ring arranged about the longitudinal axis, the method may comprise operating the redundant pivot bearing by rotating one of the detent ring and carrier ring about the longitudinal axis relative to the other to provide the detent mechanism and thereby produce the haptic feedback.

The detent ring may comprise a detent profile and the carrier ring may comprise one or more protruding elements and one or more springs. The detent ring and carrier ring may be arranged such that the one or more protruding elements are directly opposite and in contact with the detent profile, the one or more springs are preloaded to bias the at least one protruding element against the detent profile, and the detent profile and one or more protruding elements are shaped to produce the haptic feedback under the bias of the spring when there is relative rotational motion between the detent ring and carrier ring about the longitudinal axis.

The carrier ring may comprise one or more bores in the second surface, each spring arranged within each bore. Each protruding element may comprise a ball bearing received within an opening of each bore at the second surface, wherein the spring is preloaded to bias the ball bearing against the detent profile.

The detent profile may be on a radially inner surface of the detent ring directly opposite a radially outer surface of the carrier ring. The carrier ring may comprise a radially inner surface, a circumferential recess in the radially inner surface, and one or more bores extending between the circumferential recess and the radially outer surface. The one or more protruding elements may be received within each bore and protrude into the circumferential recess and out from the radially outer surface. The one or more springs may comprise a spring ring arranged within the circumferential recess in contact with the one or more protruding elements, the spring ring preloaded to bias the one or more protruding elements against the detent profile. Each protruding element may comprise a ball bearing.

The detent profile may comprise at least one groove configured to receive the one or more protruding elements such that the haptic feedback is produced as the at least one protruding element enters and/or exits the at least one groove when there is relative rotational motion between the detent ring and carrier ring about the longitudinal axis.

The primary pivot bearing may be fixed to or integral with the detent ring such that, in the event that the primary pivot bearing malfunctions, the primary pivot bearing transfers torque to the detent ring so that the primary pivot bearing and detent ring rotate together about the longitudinal axis relative to the carrier ring.

The primary pivot bearing may be fixed to or integral with the carrier ring such that, in the event that the primary pivot bearing malfunctions, the primary pivot bearing transfers torque to the carrier ring so that the primary pivot bearing and carrier ring rotate together about the longitudinal axis relative to the detent ring.

The redundant pivot bearing may comprise at least one spring that is preloaded to produce an axial force on the primary pivot bearing.

The method may comprise detecting the haptic feedback from the redundant pivot bearing with a sensor, such as a strain gauge.

The primary pivot bearing may be a rolling-element bearing. The redundant pivot bearing may be a friction bearing or a rolling-element bearing.

The detent ring may be replaced by a detent profile on the shaft.

In any of the aspects described above, by "throughout operation" it is meant that the haptic feedback is provided whenever the redundant pivot bearing is operative. For example, the haptic feedback remains substantially the same and does not diminish over time (e.g., the variation in torque remains substantially the same).

BRIEF DESCRIPTION OF DRAWINGS

One or more non-limiting examples will now be described, by way of example only, and with reference to the accompanying figures in which.

DETAILED DESCRIPTION

Figure 1:
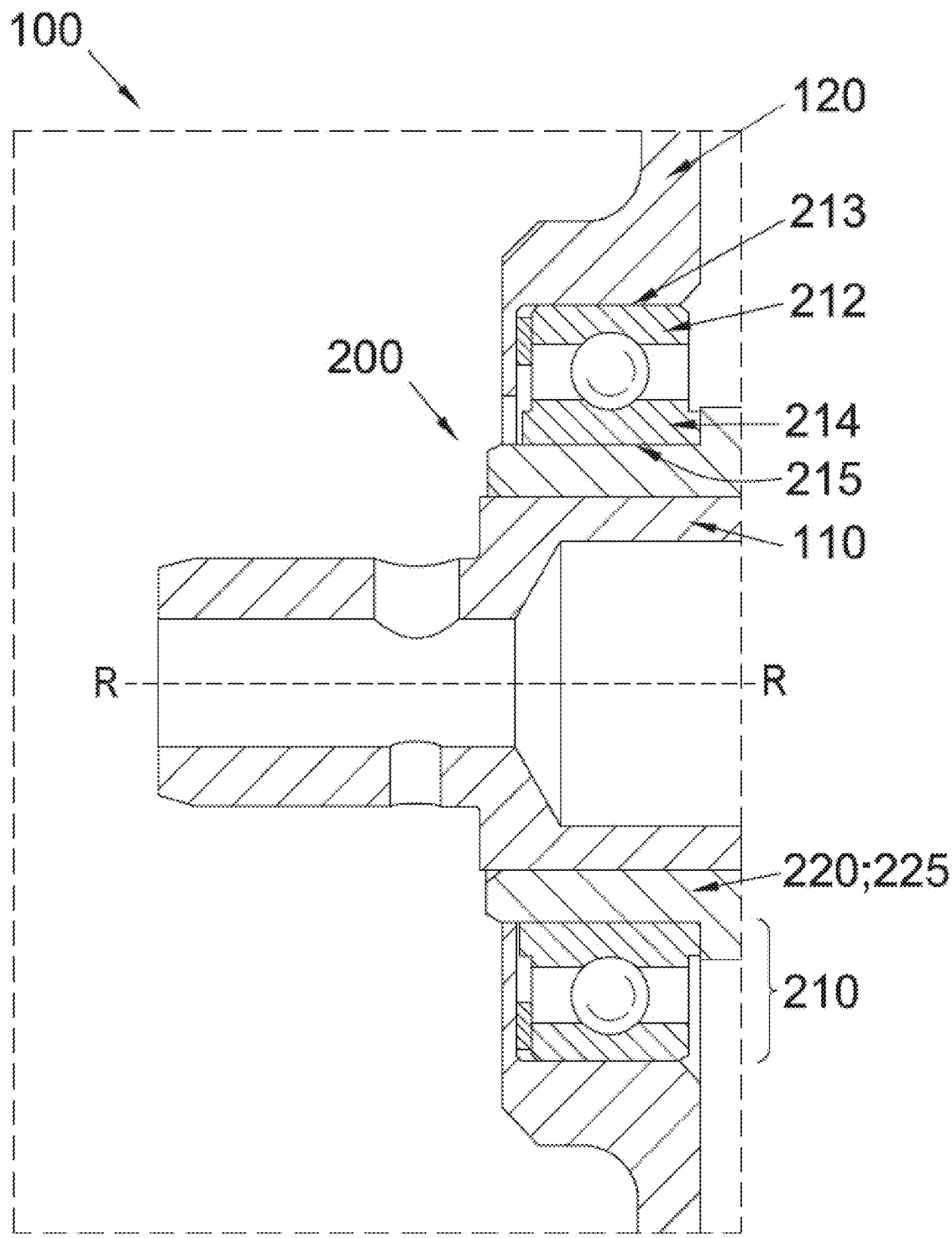
FIG. 1 shows a prior art pivot assembly as disclosed in WO 2017/182836 A1.
Figure 2:
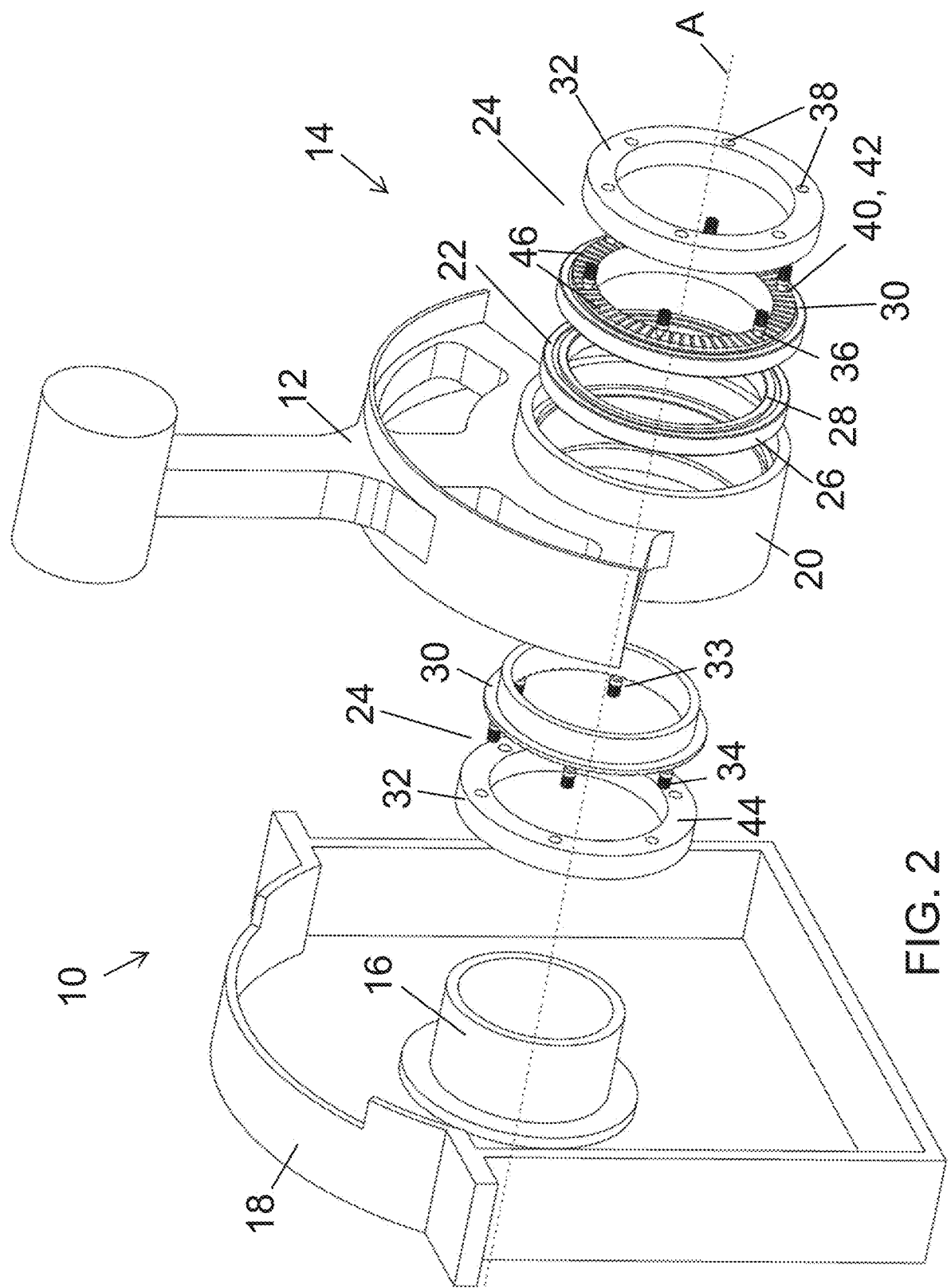
FIG. 2 shows an exploded schematic representation of a control lever assembly according to an embodiment of the present invention.

FIG. 2 shows a control lever assembly 10 for an aircraft. The control lever assembly 10 comprises a control lever 12, such as a control stick or pedal, and a pivot assembly 14 which, when assembled, is mounted about a shaft 16 within a housing 18. The shaft 16 has a longitudinal axis A. The pivot assembly 14 allows the lever 12 to pivot about the longitudinal axis A of the shaft 16. The lever 12 can be pivoted about the shaft 16 by a user, such as a pilot of an aircraft. For example, the control lever 12 may be a thrust lever that enables a pilot to control the thrust of the aircraft. Although particularly beneficial in this context, other applications are of course possible and the technical effects disclosed herein are not limited to this particular context. For example, the pivot assembly 14 is not limited to use with a control lever 12 and may be used in other pivoting systems. The control lever 12 may be any kind of mechanical input control device, including, for example, a pedal.

Figure 3:
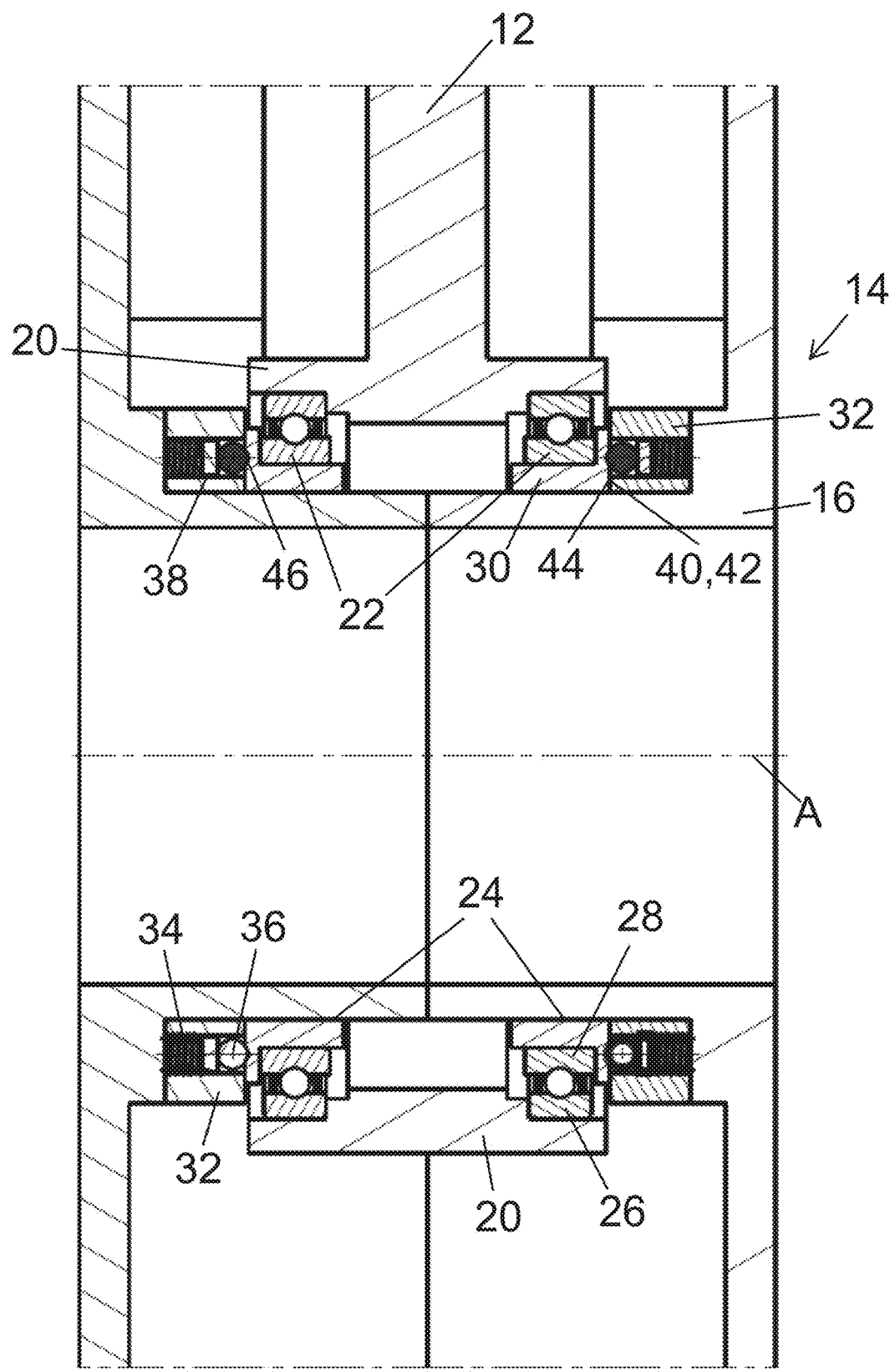
FIG. 3 shows a schematic cross-sectional representation of the control lever assembly of FIG. 2.

With additional reference to FIG. 3, the lever 12 comprises a lever ring 20 and the pivot assembly 14 is arranged radially between the lever ring 20 and the shaft 16. The pivot assembly 14 comprises at least one primary pivot bearing 22 and at least one redundant pivot bearing 24. The pivot assembly 14 shown in FIGS. 2 and 3 has a primary pivot bearing 22 and a redundant pivot bearing 24 on each side of the lever 12 in opposing orientations. However, the pivot assembly 14 may comprise just one primary pivot bearing 22 and one redundant pivot bearing 24, or more than two of each bearing 22, 24, depending on, for example, the arrangement of the lever 12 on the shaft 16 and the situation at hand.

In normal operation (i.e., without a malfunction of the primary pivot bearing 22), the primary pivot bearing 22 is operative to allow the lever 12 to pivot about the shaft 16, and the redundant pivot bearing 24 is inoperative. If the primary pivot bearing 22 malfunctions, for example due to breakage or wear, then the redundant pivot bearing 24 becomes operative to allow continued operation of the lever 12 through the pivotal motion about the shaft 16. Control levers in the cockpit of an aircraft may be safety critical, and so providing a redundant pivot bearing helps to avoid any failure in the operation of the aircraft.

The primary pivot bearing 22 is a rolling-element bearing comprising an outer race 26 and an inner race 28. The redundant pivot bearing 24 may comprise a sliding or friction bearing through contact with the shaft 16, as shown in the figures. A sliding bearing is chosen typically due to its low complexity, but any suitable type of bearing may be used as the redundant bearing 24. For example, the redundant bearing 24 may comprise a rolling-element or other suitable type of bearing.

The redundant pivot bearing 24 comprises two elements 30, 32 that are arranged to provide relative movement between them. One of the elements 30, 32 is fixed to (or integral with) the primary pivot bearing 22 and the other element 30, 32 is fixed to (or integral with) the shaft 16. If the primary pivot bearing 22 malfunctions such that relative rotation between the outer race 26 and inner race 28 is prevented, the primary pivot bearing 22 transfers the torque from the lever 12 to the element 30, 32 that is fixed to the primary pivot bearing 22, and this element 30, 32 then rotates about the shaft 16 with the lever 12 while the other element 30, 32 remains static.

When the primary pivot bearing 22 malfunctions, it is important that the malfunction is discovered as soon as possible in order to preserve the function of the lever 12 and (particularly for a friction bearing) avoid wearing on the redundant pivot bearing 24. If the redundant pivot bearing 24 were to also fail, the control lever 12 could become unusable, which could cause safety issues.

To allow the detection of the malfunction of the primary pivot bearing 22 and the operation of the redundant pivot bearing 24, the redundant pivot bearing 24 is configured to mechanically produce haptic feedback, which may be transmitted to the control lever 12 to be felt by someone operating the lever 12, and/or detected by a sensor such as a strain gauge. The feeling of the haptic feedback can be interpreted by the operator as an indication that the primary pivot bearing has failed and the redundant pivot bearing is in operation.

The haptic feedback may be produced throughout the operation of the redundant pivot bearing 24. The haptic feedback may be produced as a defined pattern of vibrations, and/or as a defined variation in the control lever driving force profile while the redundant pivot bearing 24 is operative that may or may not repeat, for example depending on how far the control lever 12 and redundant pivot bearing 24 are pivoted. In some embodiments, operation of the redundant pivot bearing 24 provides a varying driving force profile for the control lever 12 comprising a single force maximum across a complete stroke of the lever 12. In other embodiments, the varying driving force profile comprises a series of force maxima across a complete stroke of the lever 12, as demonstrated in FIG. 4 and discussed below.

In comparison to prior art systems in which a redundant pivot bearing may merely feel stiffer than a primary pivot bearing (for example if the primary pivot bearing is a rolling element bearing and the redundant pivot bearing is a sliding bearing), the present disclosure makes the operation of the redundant pivot bearing 24 more noticeable and the primary pivot bearing failure detection more robust in order to enable the time of exposure to the failure of the primary pivot bearing 22 to be minimised. In other words, the prior art systems may employ a constant load to drive the lever even when the redundant pivot bearing is operational, which may not be discernible to normal operation for (e.g.) an inexperienced operator. Using haptic feedback throughout operation of the redundant bearing is an improvement over such situations, in that the operator knows for sure that there has been a change in operation whenever they move the lever.

In embodiments, the redundant pivot bearing is provided with a detent function that causes a variation in the torque required to rotate the redundant pivot bearing 24 while the redundant pivot bearing is operative, and therefore a variation in the force that needs to be applied to the control lever 12 to drive the control lever 12 when the redundant pivot bearing 24 is operative. This variation creates the haptic feedback that may be felt by someone operating the lever 12, and/or detected by a sensor such as a strain gauge.

As shown in FIGS. 2 and 3, the elements 30, 32 of the redundant pivot bearing 24 are embodied as a detent ring 30 and a carrier ring 32. A detent profile 40 provided on the detent ring 30 cooperates with spring-loaded protruding elements 36 carried by the carrier ring 32 to provide a detent mechanism 33. In the illustrated embodiment, the detent mechanism 33 comprises a series of ball detent mechanisms 33, each comprising a spring-loaded ball bearing 36 carried by the carrier ring 32, such that the ball bearing 36 is held in position between the carrier ring 32 and the detent profile 40. The detent ring 30 and carrier ring 32 are arranged next to each other such that a surface 42 of the detent ring 30 is directly opposite a surface 44 of the carrier ring 32. The detent profile 40 is provided in this embodiment on the surface 42 of the detent ring 30. Bores 38 are provided in the surface 44 of the carrier ring 32, with a compression spring 34 and ball bearing 36 provided within each bore 38. The springs 34 force the ball bearings 36 against the opposed surface 42 of the detent ring 30 to enable the ball bearings 36 to cooperate with the detent profile 40 to provide the detent function. The detent profile 40 comprises a series of grooves or cavities 46 that can receive the ball bearings 36.

The inner race 28 of the primary pivot bearing 22 is fixed to the detent ring 30 of the redundant pivot bearing 24, or may be integral with the detent ring 30. The inner and outer races 26, 28, detent ring 30 and carrier ring 32 will typically be mounted coaxially on the shaft 16. The lever 12 can be mounted about the pivot assembly 14, as shown, with the radially outer surface of the outer race 26 of the primary pivot bearing 22 fixed to the radially inner surface of the lever ring 20.

In normal operation, when the primary pivot bearing 22 is functioning correctly, the lever 12, lever ring 20 and outer bearing race 26 can pivot about the shaft axis 16, and the inner bearing race 28, redundant pivot bearing 24 and shaft 16 are fixed. The springs 34 bias the ball bearings 36 towards the detent ring 30 and into the grooves or cavities 46 in the detent profile 40 to provide the detent function. The detent mechanism 33 thereby acts to help prevent (undesired) relative rotational motion between the detent ring 30 and carrier ring 32 when the primary pivot bearing 22 is operational. If the primary pivot bearing 22 malfunctions, for example such that relative rotation between the outer and inner races 26, 28 is no longer permitted or heavily restricted, the pivoting is instead provided by the redundant pivot bearing 24 rotating about the shaft 16.

When the primary pivot bearing 22 malfunctions in this manner, the redundant pivot bearing 24 is operational and the detent ring 30 rotates relative to the carrier ring 32. The ball bearings 36 in the carrier ring 32 then cooperate with the detent profile 40 to provide the detent function which produces haptic feedback in the lever 12 that may be felt by an operator of the lever 12 in order to notify the operator that the primary pivot bearing 22 has failed and the redundant pivot bearing 24 has become operational.

When the primary pivot bearing 22 first fails such that relative rotation between the outer and inner races 26, 28 is no longer permitted or heavily restricted, continued application of force to turn the lever 12 increases the torque applied to the redundant pivot bearing 24 through the primary pivot bearing 22, compared to when the primary pivot bearing 22 is operative. This enables enough torque to be applied to the redundant pivot bearing 24 to provide relative movement between the ball bearings 36 and the detent profile 40, so that the detent ring 30 is able to pivot about the shaft 16 with the lever 12 and primary pivot bearing 22 relative to the carrier ring 32. The torque needed to overcome the friction of the redundant pivot bearing 24 between the detent ring 30 and shaft 16 may be about the same as the torque needed to overcome the detent force between the detent ring 30 and carrier ring 32 to maximise the variation in the required lever driving force and the haptic feedback through the lever 12 when the redundant pivot bearing 24 becomes operative.

As the detent ring 30 rotates relative to the carrier ring 32, the grooves or cavities 46 in the detent profile 40 of the detent ring 30 move past the ball bearings 36 to successively align and misalign the grooves or cavities 46 with the ball bearings 36. The force exerted by the springs 34 on the ball bearings 36 (and towards the detent ring 30) causes the ball bearings 36 to enter the grooves 46 when aligned. As the ball bearings 36 enter and exit the successive grooves 46 within the detent profile 40 when the detent ring 30 rotates, the torque required to rotate the detent ring 30 changes according to the relative positions of the ball bearings 36 and grooves 46.

Figure 4:
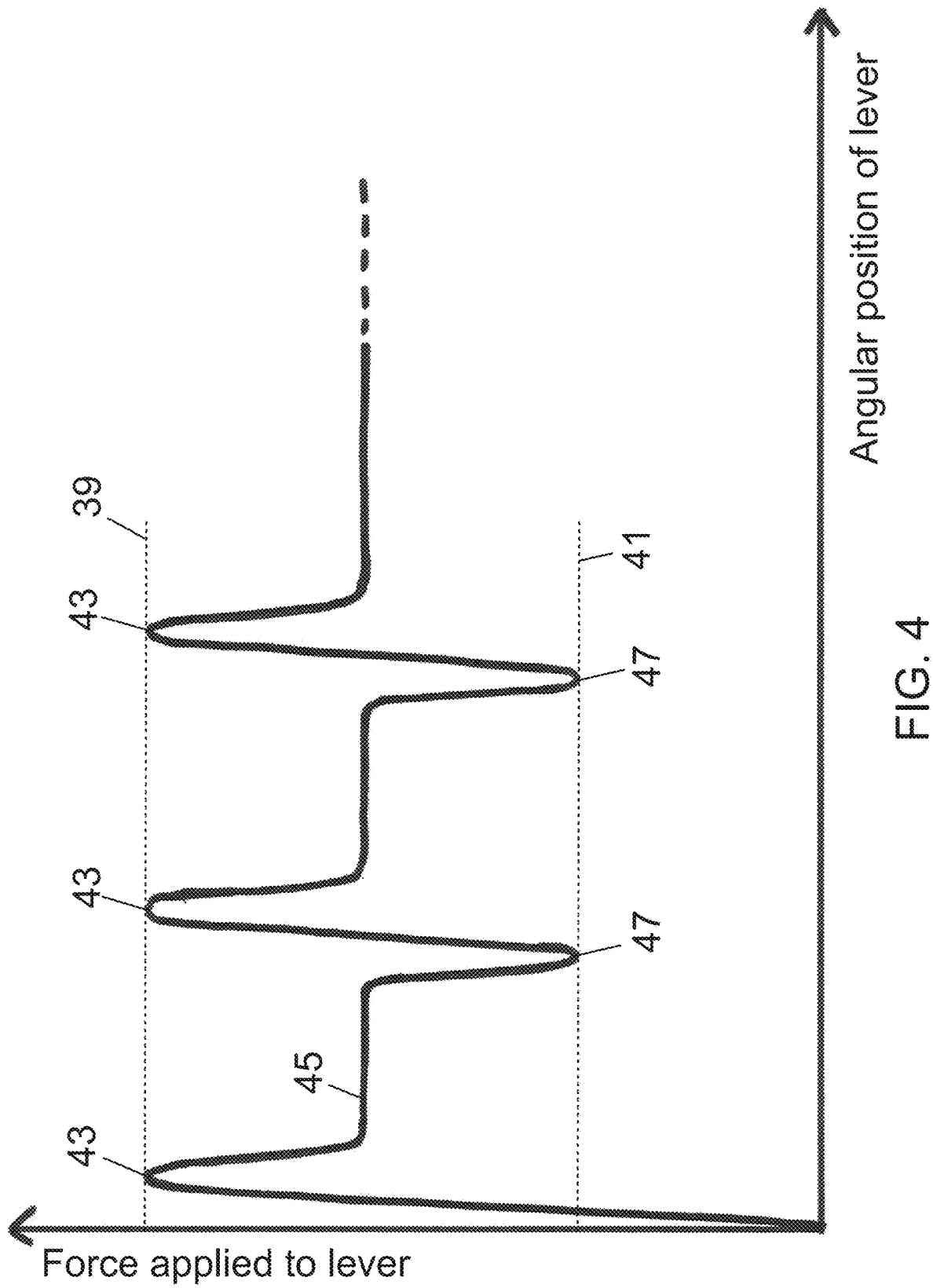
FIG. 4 shows a schematic representation of the variation in the force required to drive the control lever.

The graph in FIG. 4 shows how the force required to drive the control lever 12 to rotate the redundant pivot bearing 24 varies between a maximum force 39 and a minimum force 41 depending on the angular position of the lever 12 (i.e., as controlled by an operator), due to the relative positions of the ball bearings 36 and grooves 46. In this embodiment, when the redundant pivot bearing 24 first becomes operative, the detent ring 30 and carrier ring 32 are positioned so that the ball bearings 36 are received within corresponding grooves 46. The maxima 43 of the curve correspond to the ball bearings 36 exiting the grooves 46, and the minima 47 of the curve correspond to the ball bearings 36 entering the grooves 46. The flat sections 45 of the curve correspond to the ball bearings 36 being located between the grooves 46. The shape of the lever driving force profile shown in FIG. 4 depends on the number, shape and spacing of the grooves 46 and ball bearings 36, and the spring force of the springs 34.

The variation in the force required to drive the control lever 12 produces haptic feedback in the lever 12 that can be felt by the operator to indicate to the operator that the redundant pivot bearing 24 is operative. Only a small movement of the control lever 12 may be needed to produce the haptic feedback that can be felt by the operator. For example, the variation in the required driving force may produce noticeable haptic feedback through a single "cycle", for example as a ball bearing 36 moves from one groove 46 to the next adjacent groove 46. This minimises the angular distance through which the control lever 12 needs to be moved before the operator can tell that the primary pivot bearing 22 has failed and the redundant pivot bearing 24 is operative, which helps to minimise the safety risks associated with the failed primary pivot bearing 22.

In the embodiment of FIG. 2, the detent ring 30 is shown to have a significantly higher number of grooves 46 than the number of ball bearings 36 carried by the carrier ring 32. This embodiment has six ball detent mechanisms 33 (therefore six ball bearings 36, six springs 34 and six bores 38) distributed evenly about the carrier ring 32. The detent profile 40 is arranged continuously about the surface 42 of the detent ring 30 with evenly distributed grooves 46. Therefore, the ball bearings 36 will always be positioned within or adjacent a groove 46. This configuration enables the detent function and haptic feedback to be provided at any relative orientation of the detent ring 30 and carrier ring 32. The arrangement of the grooves 46 means that only a small relative rotation between the detent ring 30 and carrier ring 32 is needed to produce a variation in the force required to drive the control lever 12 and haptic feedback so that the failure of the primary pivot bearing 22 can be detected quickly.

It will be understood that other configurations of the detent profile 40 and ball detent mechanisms 33 may be used to produce a variation in the force required to drive the control lever 12. The springs 34, ball bearings 36 and/or detent profile 40 can be tailored to provide particular effects on the required driving force. For example, the number of ball bearings 36 and/or the number of grooves 44 within the detent profile 40 can be chosen to produce a variation in the required driving force at specific frequencies that would be more detectable by an operator of the lever 12. The bias force of the springs 34, the size of the ball bearings 36 and/or the depths of the grooves 46 in the detent profile 40 can be chosen to produce a variation in the required driving force at specific amplitudes that would be more detectable by an operator of the lever 12, but that would not hinder the operation of the lever 12. The springs 34, ball bearings 36 and/or detent profile 40 may also be tailored to produce specific patterns of variations in the required driving force that may be more noticeable by an operator of the lever 12.

For example, more than six ball detent mechanisms 33, or less than six (but at least one) ball detent mechanisms 33 may be used. The ball detent mechanisms 33 may be evenly or unevenly distributed about the carrier ring 32 and the grooves or cavities 46 may be evenly or unevenly distributed about the detent ring 30, depending on the desired variation in the required driving force. The detent profile 40 may be continuous, or may be arranged in a number of discrete sections.

In normal operation of the pivot assembly 14, the carrier ring 32 and springs 34 may also provide the additional effect of generating an axial preload on the primary pivot bearing 22 which helps to avoid backlash of the lever 12 along the axial directions.

In other embodiments (not shown), instead of each ball bearing 36 having its own spring 34 to separately force each ball bearing 36 against the detent profile 40, the redundant pivot bearing 24 may comprise a single spring arranged coaxially with the shaft 16, for example having the same diameter as the carrier ring 32. The ball bearings 36 may thus be fixed on the carrier ring 32, or may be replaced by other types of protruding elements that are fixed to or integral with the carrier ring 32. The single spring may force the whole carrier ring 32 towards the detent ring 30 to provide the detent function. The single spring may also generate an axial preload on the primary pivot bearing 22 to help avoid backlash of the lever 12 along the axial directions.

Figure 5:
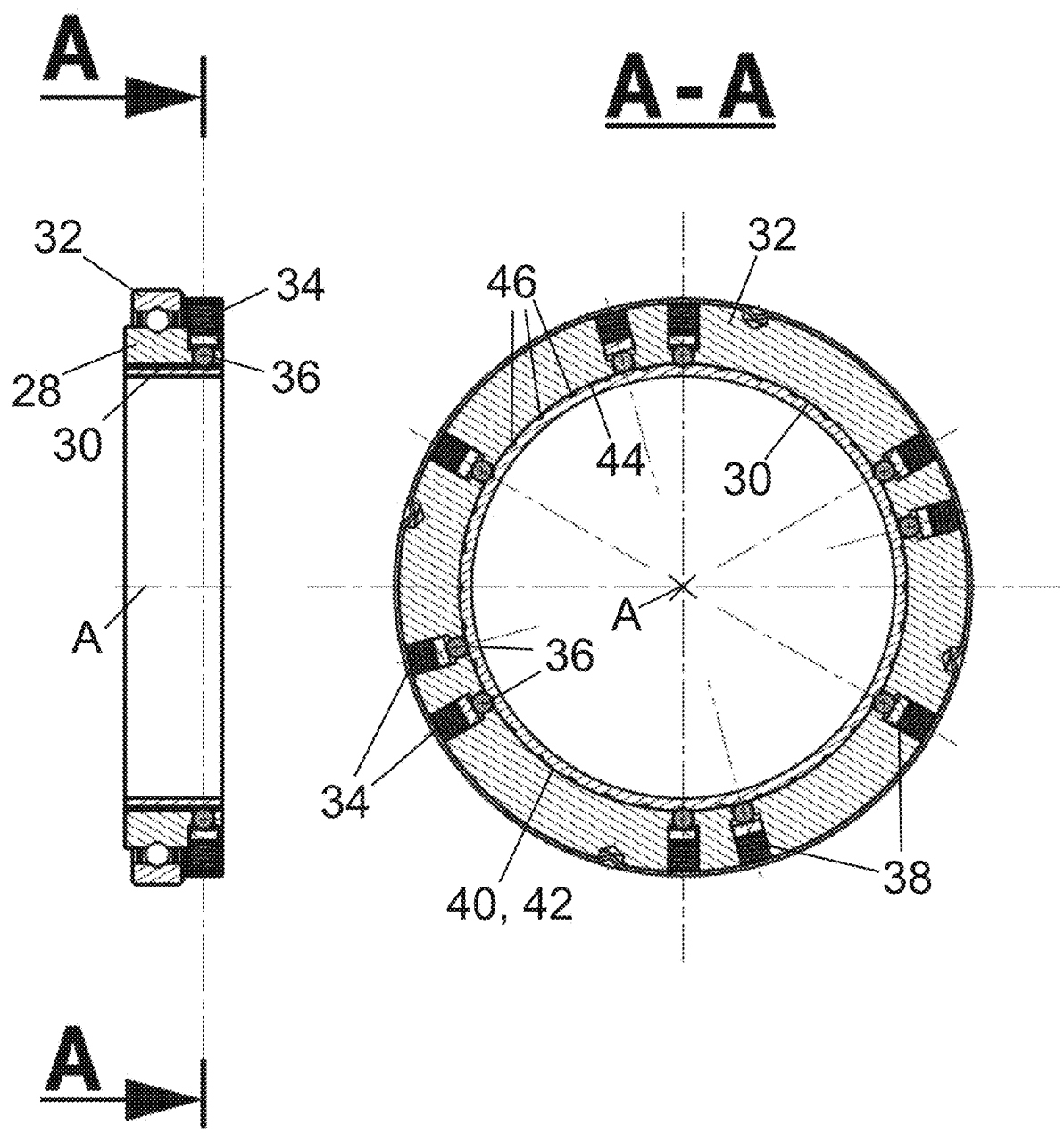
FIG. 5 shows schematic cross-sectional representations of a control lever assembly according to another embodiment of the present invention.

In the embodiment of FIGS. 2 and 3, the ball detent mechanisms 33 have an axial orientation. However, as shown in FIG. 5, another embodiment of the pivot assembly 14 may comprise ball detent mechanisms 33 with a radial orientation. In the embodiment of FIG. 5, the carrier ring 32 is fixed to (or integral with) the inner race 28 of the primary pivot bearing 22, and the detent ring 30 can be fixed to the shaft 16. Therefore, in the event of malfunction of the primary pivot bearing 22, the carrier ring 32 may rotate with the primary pivot bearing 22 relative to the detent ring 30 that is static on the shaft 16. The detent ring 30 may be integral with the shaft 16 such that the detent profile 40 is effectively provided on the surface of the shaft 16.

Although the redundant pivot bearing 24 in FIG. 5 has a different arrangement than the redundant pivot bearing 24 in FIGS. 2 and 3, the detent function is provided by a corresponding mechanism using corresponding components to produce the variation in the force required to drive the control lever 12 when the redundant pivot bearing 24 is operational. The required driving force variation provides haptic feedback to the operator of the control lever 12 that indicates that the redundant pivot bearing 24 is operative.

Figure 6:
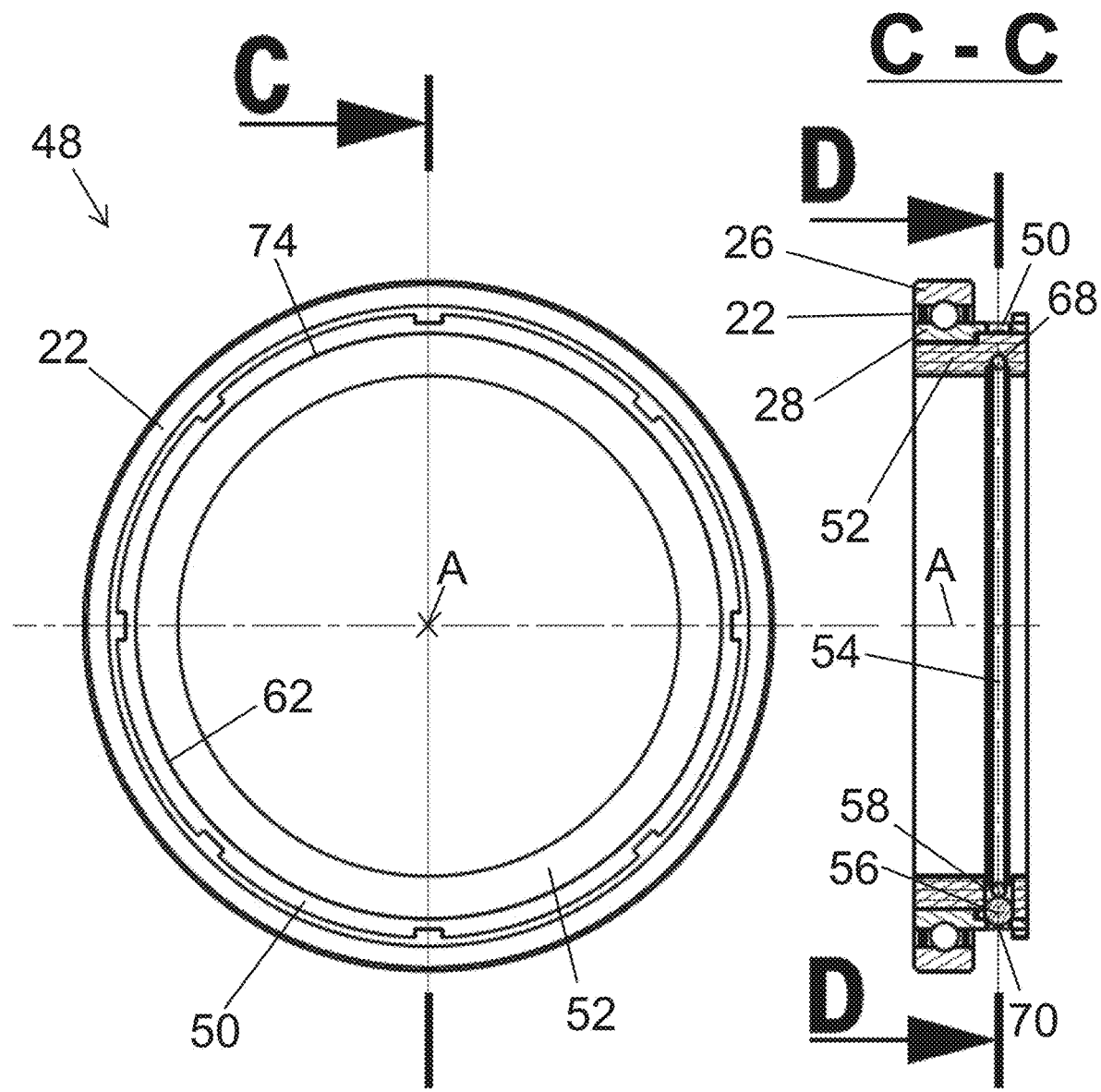
FIG. 6 shows schematic cross-sectional representations of a control lever assembly according to yet another embodiment of the present invention.
Figure 7:
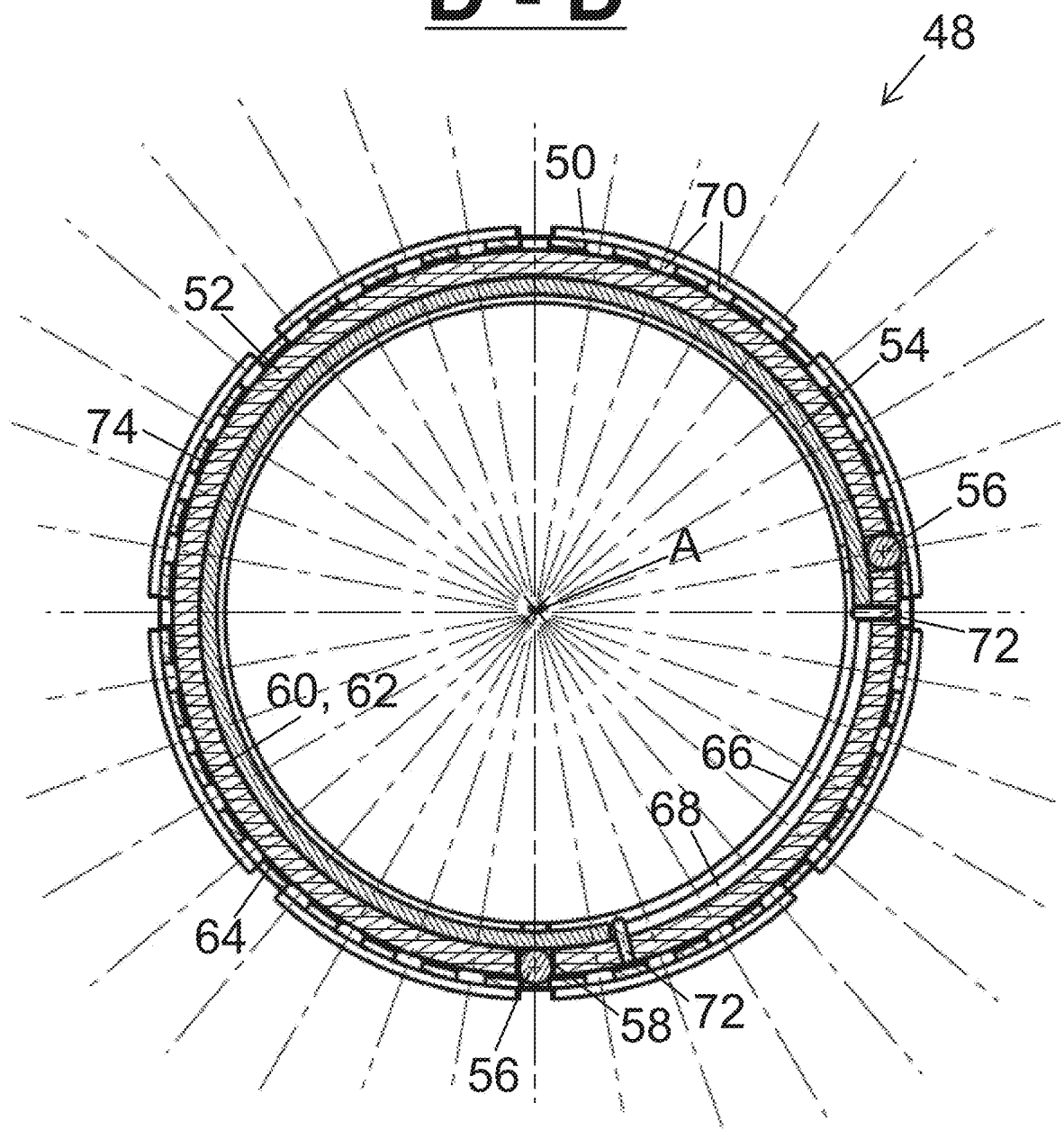
FIG. 7 shows another schematic cross-sectional representation of the control lever assembly of FIG. 6.

With reference to FIGS. 6 and 7, another embodiment of a pivot assembly 48 uses a spring ring 54, for example an internal snap ring, in the redundant pivot bearing 74, instead of the compression springs 34 of the previous embodiments. The spring ring 54 is arranged in the redundant pivot bearing 74 coaxially with the detent ring 50 and carrier ring 52.

The inner race 28 of the primary pivot bearing 22 is fixed to (or integral with) the detent ring 50, and the carrier ring 52 may be fixed to the shaft 16. The primary pivot bearing 22 and the detent ring 50 are mounted about the carrier ring 52, with the radially inner surface 62 of the detent ring 50 directly opposite the radially outer surface 64 of the carrier ring 52. The primary pivot bearing 22 can be coupled to a control lever 12 in the same way as in the embodiment of FIG. 3.

The carrier ring 52 comprises a circumferential recess 68 in its radially inner surface 66 for carrying the spring 54. The spring 54 is fitted in place within the recess 68 such that the spring ring 54 is preloaded to provide a radially outward force against the carrier ring 52. The carrier ring 52 also comprises bores 58 extending between the recess 68 and the radially outer surface 64 in which ball bearings 56 are provided such that the ball bearings 56 are held between the spring 54 and the detent ring 50. As can be seen in FIG. 7, the detent profile 60 is provided on the inner surface 62 of the detent ring 50 and comprises a circumferential series of slots or grooves 70 that can receive the ball bearings 56. The radially outward force from the spring 54 drives the ball bearings 56 outwards and against the detent profile 60. Pins 72 extend radially through the carrier ring 52 at the ends of the spring 54 to hold the spring 54 in place in the recess 68.

When the primary pivot bearing 22 is operational, there is no relative rotation between the detent ring 50 and carrier ring 52. If the primary pivot bearing 22 malfunctions, for example such that relative rotation between the outer and inner races 26, 28 is no longer permitted or heavily restricted, the pivoting is instead provided by the redundant pivot bearing 74. When the redundant pivot bearing 74 is operational, torque is transferred through the primary pivot bearing 22 to the detent ring 50 to rotate the detent ring 50 about the carrier ring 52. The primary pivot bearing 22 rotates with the detent ring 50, and the carrier ring 52 is fixed to the shaft 16.

As the detent ring 50 rotates relative to the carrier ring 52, the slots 70 in the detent ring 50 move past the ball bearings 56 to successively align and misalign the slots 70 with the ball bearings 56. The force exerted by the spring ring 54 on the ball bearings 56 (and towards the detent ring 50) drives the ball bearings 56 into the slots 70 when aligned. The entering and exiting of the ball bearings 56 into and out of the successive slots 70 within the detent profile 60 as the detent ring 50 rotates causes a variation in the torque required to rotate the redundant pivot bearing 74, and therefore a variation in the force required to drive the control lever 12. This variation of the required driving force provides haptic feedback to the operator that indicates that the redundant pivot bearing 74 is operative.

In the embodiment of FIG. 7, the detent ring 50 is shown to have a significantly higher number of slots 70 than the number of ball bearings 56. This embodiment has two ball bearings arranged about 100 degrees apart around the carrier ring 52, although a different angular spacing can be used. Other embodiments may use just one ball bearing 56, or more than two ball bearings 56.

The detent profile 60 comprises a continuous series of slots 70 around the inner circumference of the detent ring 50. Therefore, both ball bearings 56 will always be positioned within or adjacent a slot 70. This configuration enables the detent function and haptic feedback to be provided at any relative orientation of the detent ring 50 and carrier ring 52. The arrangement of the slots 70 means that only a small rotation of the detent ring 50 is needed to produce a variation in the force required to drive the control lever 12 and haptic feedback so that the failure of the primary pivot bearing 22 can be detected quickly.

It will be understood that other configurations of the detent profile 60 and ball bearings 56 may be used to produce a variation in the force required to drive the control lever 12. The spring 54, ball bearings 56 and/or detent profile 60 can be tailored to provide particular effects on the required driving force. For example, the number of ball bearings 56 and/or the number of slots or grooves 70 within the detent profile 60 can be chosen to produce a variation in the required driving force at specific frequencies that would be more detectable by an operator of the lever 12. The bias force of the spring 54, the size of the ball bearings 56 and/or the depths of the grooves 70 in the detent profile 60 can be chosen to produce a variation in the required driving force at specific amplitudes that would be more detectable by an operator of the lever 12, but that would not hinder the operation of the lever 12. The spring 54, ball bearings 56 and/or detent profile 60 may also be tailored to produce specific patterns of variations in the required driving force that may be more noticeable by an operator of the lever 12.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A pivot assembly for a control lever, the pivot assembly comprising:
   a primary pivot bearing arranged about a longitudinal axis (A); and
   a redundant pivot bearing arranged about the longitudinal axis (A),
   the redundant pivot bearing configured to become operative as a bearing in the event that the primary pivot bearing malfunctions, and
   the redundant pivot bearing also configured to produce haptic feedback in the control lever throughout operation of the redundant pivot bearing.

2. The pivot assembly of claim 1, wherein the redundant pivot bearing comprises a detent mechanism to produce the haptic feedback.

3. The pivot assembly of claim 2, wherein the redundant pivot bearing comprises a detent ring and a carrier ring arranged about the longitudinal axis (A) and configured such that, when the redundant pivot bearing is operative as a bearing, one of the detent ring and carrier ring rotates about the longitudinal axis (A) relative to the other, and the detent ring and carrier ring cooperate to provide the detent mechanism to produce the haptic feedback.

4. The pivot assembly of claim 3, wherein the detent ring comprises:
   a detent profile and the carrier ring comprises one or more protruding elements and one or more springs,
   wherein the detent ring and carrier ring are arranged such that the one or more protruding elements are directly opposite and in contact with the detent profile,
   wherein the one or more springs preloaded to bias the at least one protruding element against the detent profile, and
   wherein the detent profile and one or more protruding elements shaped to produce the haptic feedback under the bias of the spring when there is relative rotational motion between the detent ring and carrier ring about the longitudinal axis (A).

5. The pivot assembly of claim 4, wherein the carrier ring comprises one or more bores in the second surface, each spring arranged within each bore, and each protruding element comprising a ball bearing received within an opening of each bore at the second surface, wherein the spring is preloaded to bias the ball bearing against the detent profile.

6. The pivot assembly of claim 4, wherein the detent profile is on a radially inner surface of the detent ring directly opposite a radially outer surface of the carrier ring, and the carrier ring comprises:
   a radially inner surface;
   a circumferential recess in the radially inner surface; and
   one or more bores extending between the circumferential recess and the radially outer surface, the one or more protruding elements received within each bore and protruding into the circumferential recess and out from the radially outer surface, wherein the one or more springs comprise a spring ring arranged within the circumferential recess in contact with the one or more protruding elements, the spring ring preloaded to bias the one or more protruding elements against the detent profile, and each protruding element comprises a ball bearing.

7. The pivot assembly of claim 4, wherein the detent profile comprises:

at least one groove configured to receive the one or more protruding elements such that the haptic feedback is produced as the at least one protruding element enters and/or exits the at least one groove when there is relative rotational motion between the detent ring and carrier ring about the longitudinal axis (A).

8. The pivot assembly of claim 3, wherein the primary pivot bearing is fixed to or integral with the detent ring such that, in the event that the primary pivot bearing malfunctions, the primary pivot bearing transfers torque to the detent ring so that the primary pivot bearing and detent ring rotate together about the longitudinal axis (A) relative to the carrier ring.

9. The pivot assembly of claim 3, wherein the primary pivot bearing is fixed to or integral with the carrier ring such that, in the event that the primary pivot bearing malfunctions, the primary pivot bearing transfers torque to the carrier ring so that the primary pivot bearing and carrier ring rotate together about the longitudinal axis (A) relative to the detent ring.

10. The pivot assembly of claim 1, wherein the redundant pivot bearing comprises at least one spring that is preloaded to produce an axial force on the primary pivot bearing.

11. The pivot assembly of claim 1, further comprising:
a sensor to detect the haptic feedback from the redundant pivot bearing.

12. A control lever assembly comprising
comprising a control lever; and
the pivot assembly of claim 1,
wherein the pivot assembly is arranged such that the redundant pivot bearing produces haptic feedback in the control lever throughout operation of the redundant pivot bearing.

13. A method for detecting malfunction of a control lever assembly, the method comprising:

pivoting a control lever on a shaft using a pivot assembly, the pivot assembly comprising a primary pivot bearing arranged about a longitudinal axis (A) of the shaft and a redundant pivot bearing arranged about the longitudinal axis (A), the redundant pivot bearing becoming operative as a bearing in the event that the primary pivot bearing malfunctions; and throughout operation of the redundant pivot bearing, the redundant pivot bearing producing haptic feedback in the control lever.

14. The method of claim 13, wherein the redundant pivot bearing comprises a detent mechanism to produce the haptic feedback.

15. The method of claim 14, wherein the redundant pivot bearing comprises a detent ring; and a carrier ring arranged about the longitudinal axis (A), the method further comprising:
operating the redundant pivot bearing by rotating one of the detent ring and carrier ring about the longitudinal axis (A) relative to the other to provide the detent mechanism and thereby produce the haptic feedback.

* * * * *